Jan. 25, 1966      P. HUSSMANN      3,230,689
METHOD AND APPARATUS FOR DRYING GASEOUS
FLUIDS AND RECOVERING HEAT
Filed Jan. 15, 1963
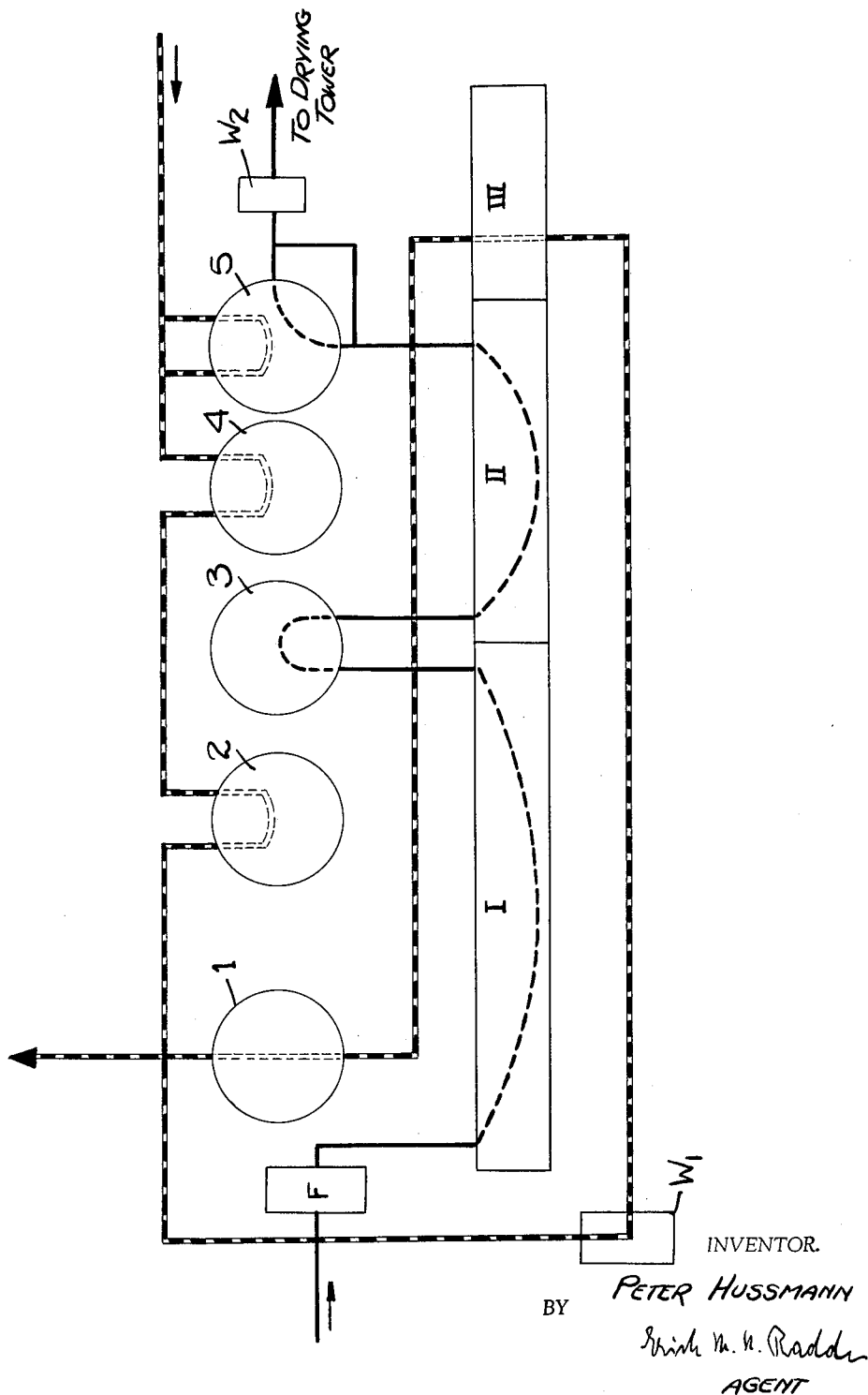
INVENTOR.
BY  PETER HUSSMANN
AGENT United States Patent Office 3,230,689
Patented Jan. 25, 1966

3,230,689
METHOD AND APPARATUS FOR DRYING GASEOUS FLUIDS AND RECOVERING HEAT
Peter Hussmann, Florence, Italy, assignor to BIRS Beteiligungs- und Verwaltungsgesellschaft AG, Basel, Switzerland, a Swiss company
Filed Jan. 15, 1963, Ser. No. 251,686
Claims priority, application Germany, Aug. 10, 1959, B 54,386
13 Claims. (Cl. 55—28)

The present application is a continuation-in-part of my copending application Serial No. 47,475, filed August 4, 1960 and since abandoned.

The present invention relates to a method and an apparatus for drying a gaseous fluid, such as air, and recovering the heat produced during the drying. It is particularly useful in supplying the drying gas required in the dehydration process and apparatus described and claimed in my application Serial No. 735,299, filed May 14, 1958, but may be used wherever a thoroughly dried gaseous fluid is needed.

It is a primary object of this invention to provide a particularly economical means for removing moisture from a moisture-containing gaseous fluid, such as atmospheric air.

The apparatus used in the method of the invention comprises three beds of a solid moisture absorbing medium, more particularly an adsorption medium, such as a silicic acid gel or aluminum oxide gel, or molecular sieves, for instance, porous zeolite crystals composed of calcium, silicon, aluminum, and oxygen, or the like, each such bed being referred to herein briefly as an "adsorption bed." The apparatus includes at least four, and preferably five, heat exchange devices, which for convenient reference are hereinafter called "regenerators." Each such regenerator contains a heat storage mass of high specific heat, such as natural stones of maximum specific weight, ceramic material, porcelain or concrete, preferably in the ideal shape of balls or tubes, which may be particulate in form and contained in suitable chambers, towers, or other containers, which may be filled therewith. Also included are two other heat exchange devices, hereinafter conveniently called "heat exchangers," to adjust the fluid temperature further as desired. Conduit means are provided to conduct a gaseous fluid, such as atmospheric air, sequentially through said beds, regenerators and heat exchangers in progressive stages and cycles whereby the moisture is removed in the moisture adsorbing media while the adsorption heat is stored in the regenerators.

The principles of this invention will become readily apparent from the specific embodiment illustrated in the accompanying drawing which schematically shows the apparatus and its operation.

As shown, there are three adsorption beds I, II and III; five regenerators 1, 2, 3, 4, and 5 for recovering the heat of adsorption and two heat exchangers W1 and W2 for further temperature adjustment.

In the drawing showing one operating cycle, the full line indicates the flow of the gaseous fluid through its drying stages, as to a drying zone, which may be provided in a tower (not shown) and the chain line indicates the flow of the gaseous regenerating fluid through the regenerating stages.

A gaseous drying fluid, such as atmospheric air, is constantly supplied through filter F to one of the adsorption beds, successive beds being so supplied in successive cycles, the fluid passing through two beds in each cycle while the third bed is being regenerated. The fluid passes through one of the regenerators on its way from one of the adsorption beds to the other and may optionally pass through a heat exchanger W2 between the second bed and the drying tower. This heat exchanger may, however, be omitted and the fluid may be conducted directly from the second adsorption bed into the drying tower.

Gaseous regenerating fluid is led consecutively through two of the regenerators, thence to a heat exchanger W1 wherein the temperature of the fluid is raised to between about 150° C. and about 170° C. when using silica gel, to about 200° C. when using aluminum oxide gel, or to between about 300° C. and about 400° C. when using molecular sieves, and then through the third adsorption bed, which is being regenerated, whence it is passed through yet another regenerator into the atmosphere.

As will be appreciated from their spacing in the drawing and the statements herein, regenerators 1, 2, and 3, 4 are grouped into two pairs, one regenerator in each pair being warmed and the other being cooled during each cycle, and each regenerator being alternately warmed and cooled in successive cycles, while the fifth (and optional) regenerator is consecutively warmed and cooled during each cycle or from cycle to cycle as desired.

In the illustrated cycle, filtered air coming from filter F has moisture removed in adsorption bed I, releasing the adsorption heat in regenerator 3, and is further dried in adsorption bed II whence it is led either directly into the tower or other drying chamber (not shown) or, optionally, shortly before the adsorption capacity of the bed is exhausted, through regenerator 5 on its way to the drying tower.

The gaseous fluid required for regenerating the adsorption beds is conducted through two regenerators 4 and 2, in that order, their temperatures having been raised to between about 80° C. and about 100° C. when using silica gel, to about 100° C. when using activated aluminum oxide gel, or between about 250° C. and about 300° C. when using molecular sieves, during a previous drying and heat recovering cycle. Thereafter, by the heat exchanger W1, the temperature of the fluid is raised further to about 150° C. and about 170° C. when using silica gel, but to higher temperatures for the other adsorption media, and the hot fluid is passed through bed III which is to be regenerated. At such periods when the fifth regenerator may still be cooled, the fluid is first led through regenerator 5 before being passed into regenerator 4. The exhaust from the regenerated adsorption bed III is passed through regenerator 1 into the atmosphere.

When another bed is to be regenerated, the fluid flow is correspondingly switched, the drying fluid flowing in the drying circuit of each cycle through two adsorption beds and at least one regenerator where it is cooled between those two beds and, optionally, through another (fifth) regenerator between the last adsorption bed and the drying tower, while the regenerating air conducted through two regenerators and heat exchanger W1 is used to regenerate one of the adsorption medium beds whence it is led through another regenerator into the atmosphere. Thus, for example, as suggested above, when adsorption bed II is exhausted, bed III, which has been regenerated, may be switched on stream with bed I, and at the same time regenerator 4 be substituted for regenerator 3 in circuit between the two beds, whereupon regenerators 3 and 1 are switched into the regenerating fluid circuit before heat exchanger W2 and bed II, from which the regenerating fluid passes through regenerator 2 and to the atmosphere.

Successive switching back and forth between the two pairs of regenerators and successive placing of the three adsorption beds into the regenerating circuit one at a time, while the other two beds are in the drying circuit, provides sequential six-cycle (2×3=6) continuous economical operation. The piping or conduiting for the cycles other than the one illustrated is omitted from the drawing for simplicity of the showing, being wholly conventional and readily apparent to persons skilled in the art, as is the related apparatus, including the valving for switching from one cycle to another.

While the invention has been described in connection with a specific embodiment, it will be understood that many modifications and variations may occur to the skilled in the art without departing from the spirit and scope of the invention as defined in the claims. More particularly, any suitable moisture adsorbing medium may be used for adsorption beds I, II and III and any suitable mass of high specific heat may constitute the heat storage masses in regenerators 1, 2, 3, 4 and 5. The beds of the moisture adsorbing medium, the regenerators, and the heat exchangers are constructed in a manner known to the art.

I claim:

1. A method of drying a gaseous drying fluid by contact with moisture adsorbing media and recovering adsorption heat from said media, comprising the steps of
   (1) conducting a moisture-containing gaseous drying fluid through a first bed of moisture adsorbing medium,
   (2) conducting said drying fluid containing adsorption heat from said first bed of moisture adsorbing medium through a first regenerator comprising a heat storage mass of high specific heat to cool said drying fluid,
   (3) conducting the cooled drying fluid through a second bed of moisture adsorbing medium,
   (4) conducting the drying fluid from said second bed of moisture adsorbing medium to a drying chamber where the drying fluid is used for drying,
and simultaneously regenerating a third bed of moisture absorbing medium by
   (5) conducting a regenerating gaseous fluid first to a second and then to a third regenerator each comprising a heat storage mass of high specific heat, said second and third regenerators storing sufficient heat from gaseous fluid having been conducted therethrough in a previous drying and heat recovering cycle to raise the temperature of the regenerating fluid,
   (6) further increasing the temperature of the regenerating fluid, by passing it through a heat exchanger, to the regeneration temperature of the third bed of moisture adsorbing medium,
   (7) conducting the hot regenerating fluid through said third bed of moisture adsorbing medium to regenerate the same, and
   (8) conducting the hot gaseous fluid from the third bed of moisture adsorbing medium through a fourth heat regenerator comprising a storage mass of high specific heat,
   (9) whereupon, in a following cycle, the first and fourth regenerators are used in effecting said raising of the temperature of the regenerating fluid while the second of said adsorbing beds is regenerated and the drying fluid is led through the third and first of said beds.

2. A method of drying a gaseous drying fluid in successive cycles by successive contact with three beds of moisture adsorbing media and recovering adsorption heat from said media in two pairs of regenerators comprising heat storage masses of high specific heat, each one of the successive cycles comprising the steps of
   (1) conducting a moisture-containing gaseous drying fluid through a first, freshly regenerated bed of adsorbing medium,
   (2) conducting said drying fluid containing adsorption heat from said first bed of moisture adsorbing medium through a first one of the two regenerators in a first one of said pairs to cool said drying fluid,
   (3) conducting the cooled drying fluid through a second bed of moisture adsorbing medium through which the moisture-containing drying fluid was first conducted in a preceding one of said cycles,
   (4) conducting the drying fluid from said second bed of moisture adsorbing medium to a drying zone to be used for drying,
and simultaneously regenerating a third bed of moisture adsorbing medium by
   (5) conducting a regenerating gaseous fluid through the second regenerator in said first pair, through which the drying fluid was conducted in the preceding cycle to be cooled,
   (6) conducting the regenerating fluid from said second regenerator in said first pair through a first one of said second pair of regenerators through which the regenerating fluid was conducted in the preceding cycle from the bed of moisture adsorbing medium being regenerated, the temperature of the regenerating fluid being raised thereby,
   (7) further increasing the temperature of the regenerating fluid, by passing it through a heat exchanger, to the regenerating temperature of the third bed of moisture adsorbing medium to be regenerated thereby,
   (8) conducting the hot regenerating fluid through said third bed of moisture adsorbing medium to regenerate the same, and
   (9) conducting the regenerating fluid from the third bed of moisture adsorbing medium through the second regenerator in said second pair,
successive cycles following the same steps, with the third bed of adsorbing medium becoming the first one, the second bed of adsorbing medium becoming the third one to be regenerated, the first bed of adsorbing medium becoming the second one, and so forth in successive cycles, while the regenerators in each of said pairs are alternated between heating and cooling in the successive cycles.

3. The method of claim 2, wherein said gaseous drying fluid is air.

4. The method of claim 2, wherein said moisture adsorbing medium is selected from the group consisting of a silicic acid gel, aluminum oxide gel, and molecular sieves.

5. The method of claim 2, wherein said heat storage mass of high specific heat is selected from the group consisting of natural stones, ceramic material, porcelain, and concrete.

6. The method of claim 2, wherein the regenerating fluid is first conducted through a fifth regenerator comprising a heat storage mass of high specific heat before being conducted through the second regenerator in the first pair and the gaseous drying fluid is then conducted through the fifth regenerator between the second bed of adsorbing medium and the drying chamber.

7. The method of claim 2, wherein the moisture adsorbing medium is active aluminum oxide and the second regenerator in the first group and the first regenerator in the second group were heated in the preceding cycle to a temperature of about 80° C. to 100° C.

8. The method of claim 2, wherein the moisture adsorbing medium is a molecular sieve and the second regenerator in the first group and the first regenerator in the second group were heated in the preceding cycle to a temperature of about 200° C. to 300° C.

9. The method of claim 2, wherein the moisture adsorbing medium is silicic acid gel and the regenerating fluid is raised in the heat exchanger to a temperature of about 150° C. to 170° C.

10. An apparatus for drying a gaseous drying fluid by contact with moisture adsorbing media and for recovering adsorption heat from said media, comprising three beds of a moisture adsorbing medium, two pairs of regenerators comprising heat storage masses of high specific heat, first conduit means for sequentially conducting the drying fluid through a first one of said beds, then through a first one of said regenerators in said first pair, subsequently to a second one of said beds and then to a drying chamber, and second conduit means for sequentially conducting a regenerating gaseous fluid through a second one of said regenerators in said first pair, then through a first one of said regenerators in said second pair, then through a heat exchanger, subsequently to a third one of said beds and finally through a second one of said regenerators in said second pair.

11. The apparatus of claim 10, further including a fifth regenerator comprising a heat storage mass and further conduit means for conducting the gaseous drying fluid from said second bed to said drying chamber through the fifth regenerator and for conducting the regenerating fluid first through said fifth regenerator.

12. The apparatus of claim 10, wherein said moisture adsorbing medium is selected from the group consisting of a silicic acid gel, active aluminum oxide gel, and molecular sieves.

13. The apparatus of claim 10, wherein said heat storage mass of high specific heat is selected from the group consisting of natural stones, ceramic material, porcelain and concrete.

References Cited by the Examiner
UNITED STATES PATENTS

| | | | |
|---|---|---|---|
| 2,661,808 | 12/1953 | Kahle | 55—74 |
| 2,995,208 | 8/1961 | Hachmuth et al. | 55—180 |
| 3,006,438 | 10/1961 | De Yarmett | 55—31 |
| 3,109,722 | 11/1963 | Dow | 55—33 X |

REUBEN FRIEDMAN, *Primary Examiner.*